(No Model.)
B. BEAUPRE.
DUST GUARD FOR JOURNAL BEARINGS.
No. 498,736. Patented May 30, 1893.
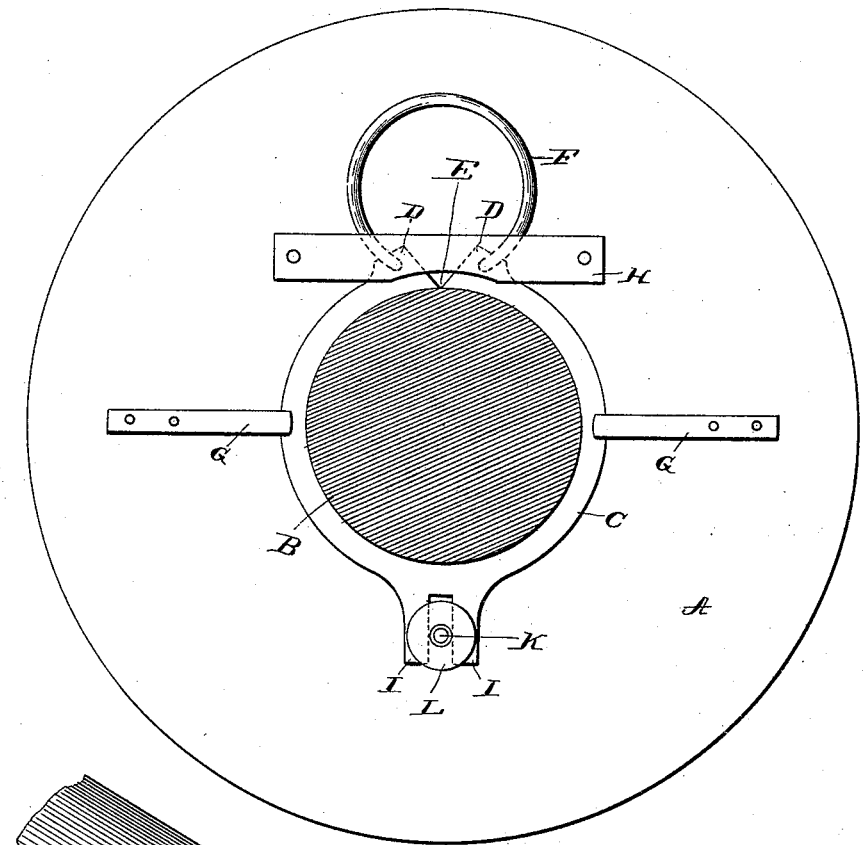
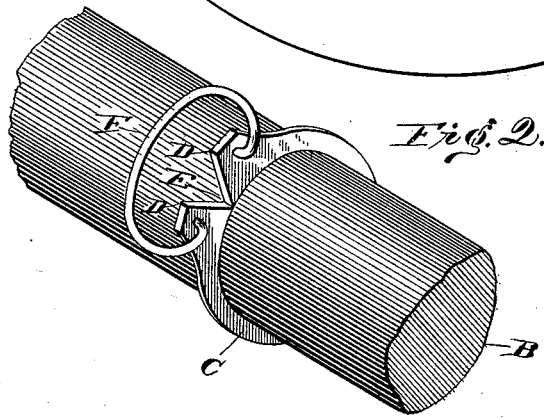
Witnesses.
J. M. Fowler Jr.
Thomas Durant
Inventor
Bruno Beaupre,
By Louis Feeser
His Attorney.

United States Patent Office.

BRUNO BEAUPRE, OF ST. PAUL, MINNESOTA.

DUST-GUARD FOR JOURNAL-BEARINGS.

SPECIFICATION forming part of Letters Patent No. 498,736, dated May 30, 1893.

Application filed August 4, 1892. Serial No. 442,129. (No model.)

*To all whom it may concern:*

Be it known that I, BRUNO BEAUPRE, of St. Paul, in the county of Ramsey and State of Minnesota, have invented certain new and useful Improvements in Dust-Guards for Journal-Bearings; and I do hereby declare the following to be a full, clear, and exact description of the same, reference being had to the accompanying drawings, forming a part of this specification, and to the letters of reference marked thereon.

This invention has for its object to provide an improved dust guard or "anti-duster" for journal bearings which shall be simple, cheap, easily applied and which will form a perfect protection for the bearing even after long continued use and wear.

The invention consists in certain novel details of construction and combinations and arrangements of parts to be now described and pointed out particularly in the appended claim.

In the drawings: Figure 1 is an end elevation of a journal bearing having my invention applied thereto with the shaft in section. Fig. 2 is a detail perspective of the dust guard removed from the bearing.

Like letters of reference in both the figures indicate the same parts.

My present invention is designed more especially for application to roller bearings such as heretofore patented to me, although capable of application to any bearings of ordinary construction.

In the drawings the letter A indicates the ends of the bearing, or casing inclosing a bearing of any desired construction, and B the shaft passing into or through the same. Riding on the shaft and fitting closely against the face of the bearing or casing, is a dust guard or ring C preferably in the form of a split ring and having the surfaces of the abutting edges of the ends inclined away from each other as shown at D D thus forming a single point of contact at E. The inner surface of the dust guard or ring fits closely upon the shaft without however, creating undue friction, as the two ends of the ring abut and prevent the same from pinching the shaft, but at the same time, the inner edge of the ring is kept in intimate contact with the shaft even though subjected to great wear, because of the fact, that the ends of the ring are brought together and abut only at the edge of the wearing surface. Hence wear at this point and throughout the ring, reduces the abutting surfaces and the ring is allowed to contract in proportion to the wear upon the inner surface.

In the preferred construction, the dust ring is of vulcanized fiber and at the ends is provided with means, such as apertures for retaining the ends of a coiled spring F the tendency of which is to clamp the ends of the ring together and at once take up any wear on the inner or wearing edge.

It is obvious that any suitable means may be employed for retaining the dust ring in place on the shaft, and closely against the bearing or casing and in the drawings I have illustrated a simple means for accomplishing these results, consisting of light springs or clips G G secured to the bearing or casing with their ends resting on the outer surface of the ring. At the top, the clip H passes across the ends of the ring and serves to retain it as well as the spring in position. At the bottom the ring is provided with downwardly extending projections, lugs or ears I I between which is located a screw or stud K carrying a washer L overlying the lugs and serving to retain the bottom of the ring in place. These downwardly extending projections or lugs I I in connection with the stud prevent the ring from rotating with the shaft, and the whole structure is such that the ring is free to move laterally or vertically with the shaft, or in other words to partake of all the lateral movements of the shaft without rotating in unison with it, thus securing an even wear on every portion of its inner edge and maintaining a perfect dust proof point at all times.

The device it will be noted is extremely simple, yet its construction is such that it forms a most perfect means for preventing the entry of dust around the shaft, is not liable to get out of order or be injured by wear, rough usage or oil and is capable of being placed in position and adjusted by any one even though not a skilled mechanic.

Having thus described my invention, what I claim as new is—

In a dust guard, such as described, the combination with the split ring formed in one piece, and having its abutting ends inclined away from each other and contacting only at the inner wearing surface, and the spring F cooperating with the ends of the ring to hold the same closed, of the bearing having the clips for holding the ring in place and the stud K and projection I for preventing the rotation of the ring; substantially as described.

In testimony whereof I have hereunto set my hand in presence of two subscribing witnesses.

BRUNO BEAUPRE.

Witnesses:
FRANK A. ELDREDGE,
H. H. MERRICK.